March 4, 1947.  L. W. SCHAAFF ET AL  2,416,852
RETAINING RING
Filed Dec. 17, 1942

Inventors
Louis W. Schaaff,
Heinrich Heimann,
Hugo Wurzel,
By J. Harold Kilcoyne
Attorney Patented Mar. 4, 1947

2,416,852

UNITED STATES PATENT OFFICE 2,416,852

RETAINING RING

Louis W. Schaaff, Jackson Heights, Heinrich Heimann, New York, and Hugo Warnel, Bronx, N. Y., assignors to Waldes Kohinoor, Inc., Long Island City, N. Y., a corporation of New York Application December 17, 1942, Serial No. 469,382

1 Claim. (Cl. 287—52)

This invention relates to improvements in retaining rings such, for example, as are disclosed in Reissue Patent No. 18,144, dated August 4, 1931, which are employed as fixtures on rotating shafts to secure various types of machine assemblies, such as bearings, gears, and the like, against axial displacements. Such retaining rings are spring rings which taper from a mid-section so as to have diminishing section height (radial thickness) towards their open ends, which is dependent upon the selected eccentricity between their outer and inner peripheries. Further, the open ends of such rings are conventionally formed as protruding legs having tool apertures to receive the points of pliers which expand the rings so that they can be applied over the shaft end and inserted in a corresponding groove of the shaft for rotation therewith.

Due to the non-symmetric shape of such a ring about its horizontal center line, i. e., the normal to the vertical center line passing between the open ends of the ring and extending through the mid-section thereof of maximum section height, centrifugal forces exerted on the rotating ring have a resultant acting along the vertical center line. This resultant depends upon both the number of shaft revolutions per minute and upon the ring diameter and can reach values sufficiently great as to disturb the balance of shafts rotating at high speeds.

It is an important object of the invention to avoid the above noted disadvantages of known retaining rings in providing a retaining ring of the character under consideration, which is substantially self-balanced. More specifically, the invention aims to provide a retaining ring which is so shaped that the algebraic sum of the resultants of the centrifugal forces exerted thereon in rotation and which act along the vertical center-line thereof equals zero whereby retaining rings in accordance with the invention may be applied to high speed shafts and the like without disturbing the balance thereof. It is a further object of the invention to provide a retaining ring which is so shaped that it is self-balanced and in which balancing is attained without sacrifice of its property of maintaining circularity and without exceeding the permissible clearance diameter thereof, i. e., the minimum inner diameter of the housing or like enclosure in which the shaft for the ring is located.

Other objects will be in part obvious and in part hereinafter pointed out in connection with the following analysis of this invention wherein is illustrated an embodiment of the invention in detail.

In the drawings—

Figure 1:
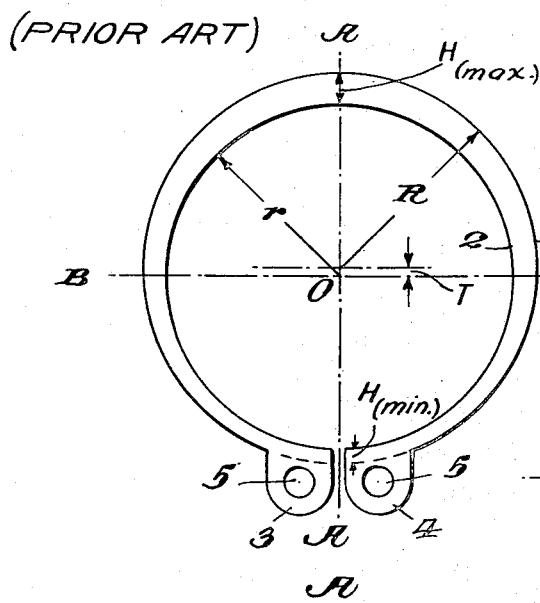
Fig. 1 is a plan view of an unbalanced retaining ring of the prior art.

Referring to Fig. 1, illustrating a known type of unbalanced ring of uniform axial thickness throughout, the same is defined by circular edges struck from centers having eccentricity T in the direction of the vertical center line A—A thereof. As shown, the outer circular edge 1 has the greater radius R and the inner circular edge 2 has the smaller radius r. The ring tapers or has diminishing section height (radial thickness) from its mid-section toward the open ends thereof, which is so calculated that the inner edge 2 maintains its initial circularity under ring deformation. The open ends of the ring are formed as protruding legs 3, 4, which are each provided with a hole 5 adapted to receive the points of pliers by which the rings may be expanded in inserting the same into a shaft groove. Heretofore, the dimensioning of the legs 3, 4 was not considered as at all critical to the operation of the ring, so long as the section height thereof did not exceed the permissible clearance diameter.

In such a ring the maximum section height or radial thickness $H_{(max)} = R - r + T$. And the minimum section height $H_{(min)} = R - r - T$. Therefore, the maximum difference of section heights equals $2T$. It should be borne in mind that the calculated diminution of the section heights of the ring from $H_{(max)}$ to $H_{(min)}$ cannot be changed lest the ring lose its capacity of circular deformation whereby it may be expanded and then released to clamp against the circular base of a shaft groove.

Figure 3:
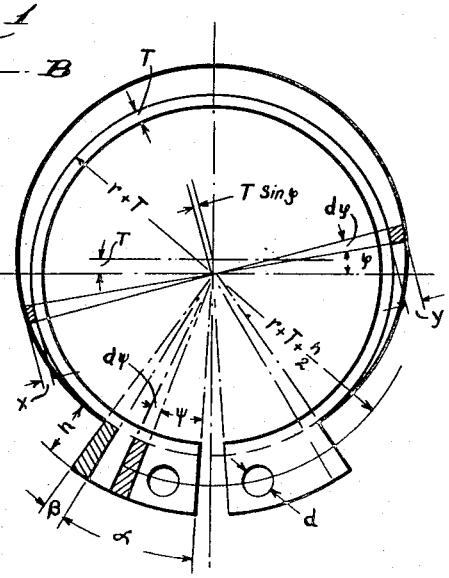
Fig. 3 represents a diagram of the ring shown in Fig. 2 for calculation purposes.

It will be observed that the Fig. 1 form of ring is non-symmetric about its horizontal center line B—B. Hence, the centrifugal forces exerted thereon in rotation generally have a resultant acting along its vertical center line A—A which can reach values large enough to disturb the balance of a shaft rotating at high speeds, to which the ring is applied. For an understanding of the invention to be described, these forces and their resultants are briefly analyzed as follows:

If a ring as illustrated in Fig. 1 but devoid of the legs 3, 4 is rotated about its center point 0, the centrifugal forces exerted thereon in rotation have a resultant C acting in the vertical center line whose value is determined according to the equation $$C = c_1 r^3 \omega^2$$

wherein $c_1$ is a coefficient, the value of which depends upon the given relation of the eccentricity T to the free radius r of the ring, and $\omega$ is the angular velocity of the ring. This equation is the result of the following development, reference being had to Fig. 3, in which $\Delta F_y$ is an element of the ring between the angles $\varphi$ and $d\varphi$.
$\Delta F_x$ is the opposite element.
$r$ is the free radius of the ring.
$T$ is the depth of the groove of the shaft and simultaneously the eccentricity between the inner and the outer circle of the ring.
$\Delta C_y$ is the centrifugal force exerted on the ring element $\Delta F_y$.
$\Delta C_x$ is the corresponding centrifugal force upon the ring element $\Delta F_x$.
$\Delta V_y$ and $\Delta V_x$ are the vertical components of these forces.
$\omega$ is the angular velocity.

$$\Delta F_y = y\left(r + T + \frac{y}{2}\right)d\phi$$

$$\Delta F_x = x\left(r + T + \frac{x}{2}\right)d\phi$$

$$x + y = 2T$$

$$r + T + y - T_x \sin \phi = r + T + x + T_x \sin \phi$$

$$y - x = 2T_x \sin \phi$$

$$y = T(1 + \sin \phi); \; x = T(1 - \sin \phi)$$

$$\Delta C_y = y\left(r + T + \frac{y}{2}\right)^2 d\phi \omega^2$$

$$\Delta C_x = x\left(r + T + \frac{x}{2}\right)^2 d\phi \omega^2$$

$$\Delta V_y = y\left(r + T + \frac{y}{2}\right)^2 \sin \phi d\phi \omega^2$$

$$\Delta V_x = x\left(r + T + \frac{x}{2}\right)^2 \sin \phi d\phi \omega^2$$

$$\Delta C = \Delta V_y - \Delta V_x =$$

$$\sin \phi d\phi \omega^2 \left\{ y\left(r + T + \frac{y}{2}\right)^2 - x\left(r + T + \frac{x}{2}\right)^2 \right\}$$

$$\{-\} = T(1 + \sin \phi)\left[r + T + \frac{T}{2}(1 + \sin \phi)\right]^2 -$$

$$T(1 - \sin \phi)\left[r + T + \frac{T}{2}(1 - \sin \phi)\right]^2$$

$$= T(1 + \sin \phi)\left(r + \frac{3}{2}T + \frac{T_x}{2}\sin \phi\right)^2 -$$

$$T(1 - \sin \phi)\left(r + \frac{3}{2}T - \frac{T}{2}\sin \phi\right)^2$$

for $T = \frac{r}{20}$ ---- $\{-\} = \frac{r}{20}\left\{(1 + \sin \phi)\left(1.075 + \frac{\sin \phi}{40}\right)^2 - \right.$ $$\left. (1 - \sin \phi)\left(1.075 - \frac{\sin \phi}{40}\right)^2 \right\} r^2 \sim$$

$$\frac{r^3}{20}\{(1 + \sin \phi)(1.156 + 0.054_x \sin \phi) -$$

$$(1 - \sin \phi)(1.156 - 0.054_x \sin \phi)$$

$\left(\frac{\sin \phi}{40}\right)^2$ is neglected for it is very small $\{-\} = (1.156 + 0.054_x \sin \phi + 1.156 \sin \phi + 0.054 \sin^2 \phi - 1.156 + 0.054_x \sin \phi + 1.156 \sin \phi - 0.054_x \sin^2 \phi) = 0.108_x \sin \phi + 2.312 \sin \phi = 2.42 \sin \phi$ $$\Delta C = \Delta V_y - \Delta V_x = \sin \phi d\phi \omega^2 \frac{r^3}{20} 2.42 \sin \phi =$$

$$.121 \sin^2 \phi d\phi r^3 \omega^2 = .121 r^3{}_x \omega^2{}_x \sin^2 \phi d\phi$$

$$C = V_y - V_x = .121 r^3{}_x \omega^2{}_x \int_0^{180°} \sin^2 \phi d\phi; \int_0^{180°} \sin^2 \phi d\phi = \frac{\pi}{2}$$

$$C = V_y - V_x = .121 r^3{}_x \omega^2{}_x \frac{\pi}{2} = .19 r^3{}_x \omega^2 \text{ or}$$

$$C = c_{1x} r^3{}_x \omega^2$$

The resultant $C_E$ of the centrifugal force exerted by the legs 3 and 4 thereof can also be calculated in like manner and, as the resultants C and $C_E$ are opposite, the resultant of the centrifugal forces exerted on the rotating ring as shown in Fig. 1 equals $C - C_E$.

Figure 2:
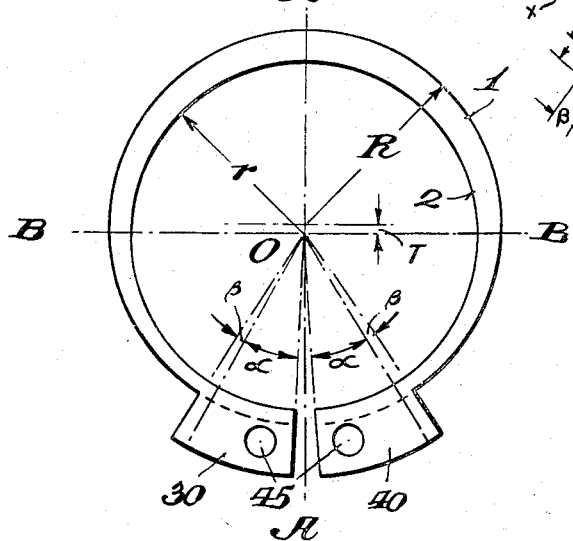
Fig. 2 is a plan view of a retaining ring of the same general form and diameter as shown in Fig. 1, but which is self-balanced in accordance with the invention.

The ring portion proper of the retaining ring according to the invention, as shown in Fig. 2, has the same shape as the ring portion of the retaining ring illustrated in Fig. 1, its outer edge 1 being struck on radius R and its inner edge 2 being struck from a center C of the ring on a radius $r$, said centers being eccentric in the direction of the vertical center line by the distance T. In the ring according to the invention, however, the same is so shaped that the resultant of the centrifugal forces acting on the ring in the direction of its vertical center-line are equal and opposite, whereby the ring is self-balanced in rotation, while at the same time the calculated diminution of the section height of the ring from maximum to minimum is preserved, whereby the ring maintains circularity under deformation. These advantageous results are accomplished in a ring having uniform axial thickness throughout by so determining the dimensions and hence the area of the legs 30, 40 thereof that the resultant $V_E$ of the centrifugal forces acting in a vertical direction on the legs has the same magnitude as the resultant C of the centrifugal forces acting in the vertical direction on the ring portion only of the complete ring. Thus in the ring according to the invention, C equals $V_E$.

To calculate the area of the legs 30, 40 according to the invention, the same section height thereof as in the ring of Fig. 1 is preferably maintained, whereby the permissible clearance diameter of the ring is not exceeded, but the angular width of the legs is enlarged. This angular width is measured by the angle $\alpha$ between side edges of a leg and accordingly the resultant $V_E$ of the centrifugal forces exerted on so-formed legs is determined from the equation $$V_E = c_2 r^3 \omega^2 \sin \alpha$$

wherein $c_2$ is a coefficient depending upon the chosen relation between eccentricity T and section height $h$ of a leg to the free radius $r$ of the ring. This formula is derived from the equation $$2V_E = 2h\left(r + T + \frac{h}{2}\right)^2 \sin \alpha . \omega^2$$

wherein $h$ represents the protruding width of the ring ears,
$r$ represents the free radius of the ring,
T represents the groove depth,
$\alpha$ represents the angle between the inner edge of the ear and the outer edge of the ear,
$\omega$ represents the angular velocity.

Now, T and $h$ can be expressed according to the constant relation to $r$. For example, if $h = 5T = \frac{r}{4}$, then $h\left(r + T + \frac{h}{2}\right)^2 =$ $$\frac{r}{4}\left(r + \frac{r}{20} + \frac{r}{8}\right)^2 = C_2 r^3$$

Since, under the condition of self-balancing as described, C equals $V_E$, the angle $\alpha$ can now be solved for according to the equation $$C = c_1 r^3 \omega^2 = V_E = c_2 r^3 \omega^2 \sin \alpha$$

and $$\sin \alpha = \frac{c_1}{c_2}$$

As the legs 40 are each provided with an aperture 45 for plier points adapted to expand the ring in the application thereof to a shaft groove, consideration must be given also to the area of these holes by which the resultant of the centrifugal forces on the legs is decreased. This is satisfied by adding to the angle $\alpha$ an angle $\beta$, and extending the width of the legs an angular amount corresponding to the latter whereby the increment to each leg corresponds to the area of the hole 45 thereof. The value of $\beta$ is calculated as follows:

Assuming that the centrifugal force of the hole area acts on the center of the hole, radial distance of which is $$r + T + \frac{h}{2}$$

then the centrifugal force exerted on this hole area $\frac{\pi d^2}{4}$ will be $\frac{\pi d^2}{4}\left(r + T + \frac{h}{2}\right)\omega^2$ The area of the hole is replaced by a material strip of an area $$\left(r + T + \frac{h}{2}\right)h\beta$$

at the outer edge of the lug. The centrifugal force acting on this strip is $$\left(r + T + \frac{h}{2}\right)^2 h\beta\omega^2$$

From this follows the equation:

$$\frac{\pi d^2}{4}\left(r + T + \frac{h}{2}\right)\omega^2 = \left(r + T + \frac{h}{2}\right)^2 h\beta\omega^2$$

and $$\beta = \frac{\pi d^2}{4h\left(r + T + \frac{h}{2}\right)}$$

or $$\beta^\circ = \beta \frac{180}{\pi}$$

For instance:

I. For $h = 5T = \frac{r}{4}$ and $d = .062''$ and $r = .462''$ $$\beta^\circ = \frac{\pi d^2}{r\left(r + \frac{r}{20} + \frac{r}{8}\right)} \cdot \frac{180}{\pi} =$$

$$\frac{(.062)^2(180)(40)}{47(.462)^2} = 2.76^\circ = 2^\circ 46'$$

II. For $h = 4T = \frac{r}{5}$ and $d = .078''$ and $r = .693''$ $$\beta^\circ = \frac{\pi d^2}{\frac{4}{5}r\left(r + \frac{r}{20} + \frac{r}{10}\right)} \cdot \frac{180}{\pi} =$$

$$\frac{(.078)^2(180)(25)}{23(.693)^2} = 2.48^\circ = 2^\circ 29'$$

III. For $h = 3T = \frac{3r}{20}$ and $d = .110''$ and $r = 1.387''$ $$\beta^\circ = \frac{\pi d^2}{\frac{3}{5}r\left(r + \frac{r}{20} + \frac{3r}{40}\right)} \cdot \frac{180}{\pi} =$$

$$\frac{(.110)^2(180)(40)}{27(1.387)^2} = 1.69^\circ = 1^\circ 41'$$

Note is made that $\beta$ is given in radians and $\beta^\circ$ is given in degrees.

Thus, the overall width of each leg is such that the resultant of the centrifugal forces exerted thereon balance out the resultant of the centrifugal forces exerted on the ring proper.

According to the invention as defined, therefore, a self-balanced retaining ring is attained, without affecting the calculated taper or diminution of the height thereof which cannot be changed lest the ring lose its capacity of circularity under deformation. Accordingly, a retaining ring as described may be applied as heretofore to shafts rotating at high speeds without disturbing the balance thereof.

As many changes could be made in carrying out the above construction without departing from the scope of the invention, it is intended that all matter contained in the above description or shown in the accompanying drawings shall be interpreted as illustrative and not in a limiting sense.

We claim:

A self-balanced retaining ring comprising an open-ended spring ring, the section height of which progressively diminishes towards its open ends, the open ends being formed as radially outwardly protruding legs each having a tool aperture therein, the ring body proper and the legs having uniform axial thickness throughout, the legs having radial depth which is no greater than the maximum section height of the ring body proper, whereby the legs conform to the permissible clearance diameter of the ring, and having angular width of dimension such that in rotation of the ring the resultant of the centrifugal force proportional to leg area which is exerted on the legs equals the resultant of the centrifugal force exerted on the ring body proper, whereby the ring is balanced about its axis of rotation.

LOUIS W. SCHAAFF.
HEINRICH HEIMANN.
HUGO WURZEL.

REFERENCES CITED

The following references are of record in the file of this patent:

UNITED STATES PATENTS

| Number | Name | Date |
|---|---|---|
| Re. 18,144 | Heiermann | Aug. 4, 1931 |
| 1,666,352 | Rouanet | Apr. 17, 1928 |